US012600518B2

(12) United States Patent
Mayer

(10) Patent No.: US 12,600,518 B2
(45) Date of Patent: Apr. 14, 2026

(54) CONTAINER TRANSPORT SYSTEM AND METHOD FOR TRANSPORTING CONTAINERS

(71) Applicant: Krones AG, Neutraubling (DE)

(72) Inventor: Josef Mayer, Regensburg (DE)

(73) Assignee: KRONES AG, Neutraubling (DE)

( * ) Notice: Subject to any disclaimer, the term of this patent is extended or adjusted under 35 U.S.C. 154(b) by 90 days.

(21) Appl. No.: 18/457,650

(22) Filed: Aug. 29, 2023

(65) Prior Publication Data

US 2024/0076089 A1     Mar. 7, 2024

(30) Foreign Application Priority Data

Sep. 5, 2022     (DE) ..................... 10 2022 122 377.9

(51) Int. Cl.
*B65C 9/06*          (2006.01)
*B65C 9/04*          (2006.01)
        (Continued)

(52) U.S. Cl.
CPC .................. *B65C 9/06* (2013.01); *B65C 9/04* (2013.01); *B65C 9/40* (2013.01); *B65G 47/846* (2013.01); *B65G 29/00* (2013.01)

(58) Field of Classification Search
CPC ........ B65G 47/846; B65G 29/00; B65C 9/06; B65C 9/04; B65C 9/40
        (Continued)

(56) References Cited

U.S. PATENT DOCUMENTS 5,542,233 A * 8/1996 Graffin .................. B67C 7/0046
                                                          53/367
11,772,902 B2   10/2023 Kollmuss et al.
                        (Continued)

FOREIGN PATENT DOCUMENTS

CN        101511681 A      8/2009
CN        103702917 A  *  4/2014   ............. B65G 47/24
                        (Continued)

OTHER PUBLICATIONS

China National Intellectual Property Administration, Office Action and Search Report Issued in Application No. 202311128363.9, Dec. 27, 2025, 26 pages. (Submitted with Partial Translation).

*Primary Examiner* — James R Bidwell
(74) *Attorney, Agent, or Firm* — McCoy Russell LLP

(57)          ABSTRACT

The disclosure relates to a container transport system for transporting a plurality of containers along a transport path comprising a first container transport device having a plurality of first transport elements for holding and transporting the containers, a detection device, a second container transport device comprising a plurality of second transport elements for holding and transporting the containers, wherein the second container transport device is arranged along the transport path downstream of the first container transport device. The detection device is configured to detect the orientation of a container held by a first transport element, and the second container transport device is configured to align a second transport element based on the orientation of the container held by the first transport element, which orientation is detected by the detection device, in order to receive the container.

The disclosure also relates to a method for transporting containers.

15 Claims, 3 Drawing Sheets

(51) Int. Cl.
      *B65C 9/40*          (2006.01)
      *B65G 29/00*          (2006.01)
      *B65G 47/84*          (2006.01)
(58) Field of Classification Search
      USPC ................................ 198/470.1, 478.1, 475.1
      See application file for complete search history.

(56)                    References Cited

U.S. PATENT DOCUMENTS

| | | | | |
|---|---|---|---|---|
| 2007/0028563 | A1* | 2/2007 | Fritsche | .................... B65C 9/06 |
| | | | | 53/410 |
| 2013/0312896 | A1* | 11/2013 | Giuliani | .................... B65C 9/04 |
| | | | | 156/499 |
| 2017/0096320 | A1* | 4/2017 | Zoni | ........................ B67C 7/004 |
| 2024/0278952 | A1* | 8/2024 | Breu | .................... B65G 47/244 |

FOREIGN PATENT DOCUMENTS

| | | | | | |
|---|---|---|---|---|---|
| DE | 7523323 | U | 11/1975 | | |
| DE | 102007031218 | A1 | 1/2008 | | |
| DE | 202009012064 | U1 | 2/2011 | | |
| DE | 202009018193 | U1 | 4/2011 | | |
| DE | 102014224519 | A1 * | 6/2016 | .............. | B65C 9/06 |
| DE | 102019121429 | A1 | 2/2021 | | |
| EP | 2292550 | A1 | 3/2011 | | |
| EP | 3209571 | B1 | 8/2018 | | |
| JP | S52106097 | U | 8/1977 | | |
| JP | 2018127259 | A | 8/2018 | | |
| KR | 101462267 | B1 | 11/2014 | | |
| WO | 03024808 | A2 | 3/2003 | | |
| WO | 2008028524 | A1 | 3/2008 | | |

* cited by examiner

CONTAINER TRANSPORT SYSTEM AND METHOD FOR TRANSPORTING CONTAINERS

CROSS REFERENCE TO RELATED APPLICATION

The present application claims priority to German Patent Application No. 10 2022 122 377.9 filed on Sep. 5, 2022. The entire contents of the above-listed application are hereby incorporated by reference for all purposes.

TECHNICAL FIELD

The disclosure relates to a container transport system and to a method for transporting containers.

BACKGROUND

Container transport systems are regularly used for the automated handling of containers, for example plastic bottles, in plants of the consumer goods and/or food industry.

In the course of the progressive development of such systems, these are blocked so that the individual machines are directly connected to one another via transfer star-wheels, as described, for example, in EP 2 292 550 A1. The plastic bottles are processed in a block. For example, a block comprises a blow molding machine in which preforms are heated and blown into the final bottle shape, a labeling machine that applies labels to the bottles, and a filler that fills bottles with the filling medium, for example a liquid food, oil or other flowable medium.

The bottles are handled between the blow molding machine and the labeling machine and between the labeling machine and the filler during neck handling by what are known as transfer star-wheels. In the transfer star-wheels, the bottles are gripped at the neck, for example, by grippers.

During neck handling, the bottles are to a certain extent freely rotatable about longitudinal axes of the bottles, so that different orientations of the bottles in the grippers are set. Correcting the rotational position is not easily possible during neck handling.

The handling of the bottles in the labeling machine takes place, for example, during standing transport on plates. As a result, the orientation of the bottles relative to the machine that applies the label can be better controlled than during neck handling. The bottles also do not rotate as easily during standing transport as they do in a gripper during neck handling.

For accurate orientation of the bottles with respect to the machine that applies the label, it is important that the bottles are firmly seated on and/or in the plate. The receptacle for the bottles on and/or in the plate is ideally adapted to the base area of the bottles.

Conventional round receptacles provide satisfactory adaptation to round and some square bottle shapes. The bottles are oriented using the receptacles for label application.

For example, WO 03/024808 A2 and WO 2008/028524 A1 disclose devices for orienting round containers for applying labels.

DE 20 2009 018 193 U1 relates to the orientation of round bottles based on a marking for printing the bottles in a suspended receptacle and describes the holding on one and the same holding and centering unit from the container inlet to the container outlet.

Rectangular bottles, on the other hand, cannot be received, held and transported by round plate-like receptacles without problems. Rectangular bottle shapes require a receptacle adapted to the bottle shape.

One challenge here is to correctly transfer the rectangular bottles to the receptacles and avoid problems when transferring bottles of any shape.

SUMMARY

In view of this, the object of the disclosure is to avoid problems when transferring containers.

This object is achieved by a container transport system as described herein.

The disclosure provides a container transport system for transporting a plurality of containers along a transport path, comprising a first container transport device having a plurality of first transport elements for holding and transporting the containers, a detection device, a second container transport device having a plurality of second transport elements for holding and transporting the containers, wherein the second container transport device is arranged along the transport path downstream of the first container transport device, wherein the detection device is configured to detect the orientation of a container held by a first transport element, wherein the second container transport device is configured to orient a second transport element based on the orientation of the container held by the first transport element, which orientation is detected by the detection device, in order to receive the container.

The container transport system according to the disclosure achieves the underlying object of avoiding problems during the transfer of containers caused by a non-aligned transport element.

The detection of the orientation of a container on or in the first transport device, which is arranged along the transport path upstream the second transport device, allows a particularly efficient and reliable determination of the (required) orientation of a second transport element of the second transport device (arranged downstream) which receives or accepts the container.

The arrangement of the second container transport device along the transport path downstream of the first container transport device means that the second container transport device is arranged in the direction of the transfer of the containers (during operation of the container transport system and along the transport path). This direction is therefore the direction in which the containers are transferred or transported, i.e., in particular a direction from the first container transport device to the second container transport device.

Between the detection of the orientation of the container and the receiving of the container, the orientation of the container does not change or changes only predictably. The orientation of the container at the time of receiving can be inferred from the detected orientation of the container.

The alignment (or orientation or positioning) of the container detected by the detection device can be an alignment (orientation or positioning) of the container with respect to the transport direction of the container.

In the case of a circular transport path (for example in a rotary unit such as a transfer star-wheel or carousel) of the container, the transport direction can be a tangent to the transport path. In the case of a linear transport path, the transport direction can coincide with the direction of travel.

The orientation can be an angle to the transport direction in the transport plane. In this case, the transport plane can coincide with the plane in which the containers are transported. In addition, the orientation can be the rotational orientation and/or rotational position of the container about a vertical axis and/or a longitudinal axis of the container with respect to a plane that is tangential to the transport direction and in which the axis is located. The vertical axis and/or the longitudinal axis of the container can be central axes.

The orientation can be the angle that, when viewed from above in a cross-sectional plane, includes a characteristic axis and/or a central longitudinal axis and/or a large semi-axis of the cross-sectional shape of the container with the transport direction. In this case, "from above" is from the direction of the bottle opening in contrast to "from below," which is from the direction of the bottle bottom.

Furthermore, the orientation can be the rotational orientation and/or rotational position and/or the angle of the container about a vertical axis and/or a longitudinal axis of the container with respect to a radial direction and/or a radius of the first container transport device.

The alignment of the second transport element can be an adjustment and/or rotation and/or positioning.

The alignment of the second transport element for receiving the container can be an alignment during receiving and/or an alignment before receiving.

The second transport element can be oriented relative to the container when the container is received and/or at the time the container is received.

Receiving the container can be a reception and/or an acceptance and/or a transfer.

The container transport system can comprise a control device, wherein the control device is designed to generate an orientation signal for orienting the second transport element based on the detected orientation.

The control device is used for the control between the detection device and the second transport element, allowing to better take into account the state of the container transport system.

The control device can be designed as part of the first container transport device and/or as part of the second container transport device and/or as part of the detection device and/or as an independent device. In particular, the control device can be a central control device or the control device can comprise a plurality of decentralized parts.

The detection device can be connected to the second container transport device in a wireless and/or wired manner.

A wireless connection provides a high degree of connection flexibility and eliminates the need for cables. In addition, a wireless connection eliminates the complexity of sliding contacts for connecting movable parts of the container transport system. A wired connection allows for a high transmission reliability and data rate and is largely immune to interference.

The wired connection can be made via the control device.

The connection can be made by means of a bus. The wireless connection can be configured via Bluetooth and/or WiFi.

The container transport system can have a storage device, in particular a shift register, for assigning the orientation signal to the second transport element.

The use of a storage device allows the orientation signal to be stored for later reuse. A shift register is a simple realization of a storage device having an inherently advantageous storage structure for mapping a sequence. This saves storage resources.

The storage device can store the orientation of the container.

The second container transport device can be configured to rotate the second transport element about a vertical axis for orientation.

The rotation of the second transport element about a vertical axis allows the second transport element to be aligned in a simple manner and thus the container to be held securely.

The first transport elements can be designed for hanging or standing transport of the containers. Alternatively or additionally, the first transport elements can comprise grippers in the case of the configuration for hanging transport, or plates comprising receptacles for the containers in the case of the configuration for the standing transport. Alternatively or additionally, the second transport elements can be designed for hanging or standing transport of the containers. Alternatively or additionally, the second transport elements can comprise grippers in the case of the configuration for hanging transport, or plates comprising receptacles for the containers in the case of the configuration for standing transport. Alternatively or additionally, the containers can be bottles.

Hanging transport of the containers allows for a compact construction of the container transport device and easy accessibility of the containers. Standing transport of the containers has the advantage that the containers are easy to orient.

The containers can be kept upright and transported in the first and/or the second transport elements.

In particular, the first transport elements can comprise grippers for the hanging transport of the containers, and the second transport elements can comprise plates with receptacles for the containers for the standing transport of the containers. In particular, the first container transport device can be a transfer star-wheel and the second container transport device can be a carousel.

In the case of the configuration for standing transport, the plates can have a noncircular base area, in particular an elliptical or polygonal base area, in particular a rectangular base area, in particular a square base area.

The shaped base areas of the transport elements allow the standing transport in the transport elements to be flexibly adapted to different container shapes and to be designed to be safe.

In particular, the receptacles of the plates can have a noncircular base area, in particular an elliptical or polygonal base area, in particular a rectangular base area, in particular a square base area.

All of the polygonal base areas can also be corresponding base areas having rounded corners.

The container receptacles can be adapted to the container bottom geometry. The container receptacle can be designed to be able to grip the container bottom with at least a partial positive fit. This includes a polygon, oval or the like worked into a container receptacle, or also a profile (such as a depression) on the container receptacle for a container bottom having a plurality of feet, for example a petaloid bottom. This can result in particularly good rotational force application with a lower pretensioning force by centering tulips in a particularly advantageous manner, for example for subsequent alignment of the containers for further treatment.

The detection device can have an image capturing device, in particular a camera. Alternatively or additionally, the detection device can have a rotation angle sensor, in particular a rotation angle sensor based on a potentiometer. Alternatively or additionally, in the case of the image capturing device, the detection device can be designed to detect a first transport element from below and/or above and/or laterally. Alternatively or additionally, in the case of the image capturing device, the detection device can be designed to detect the orientation of the container held by the first transport element by recording an image.

With the aid of the detection device, information about the orientation of the container in the first transport element is obtained in a simple manner.

The detection device can be designed to detect the containers from below and/or above and/or laterally.

In this case, "from above" is from above in the direction of the bottle opening in contrast to "from below," which is from below in the direction of the bottle bottom.

An angle describing the alignment (orientation or positioning) of the container can be determined from the image. For example, in an image of a container held by the first transport element from above, an angle that a major semi-axis of a container cross section encloses with the transport direction can be determined. Based on this angle, the second container transport device can orient the second transport element in order to receive the container.

In the event that the container transport system comprises a control device, the control device can receive and analyze images of the camera.

The container transport system can be configured to detect the orientation without interrupting the transport of the container.

The detection of the orientation without interrupting transport allows the containers to be transported smoothly and quickly.

By detecting the orientation without interrupting the transport of the container, the transport is not stopped and/or the containers are not transported on a secondary route.

If the rotational position of one or more containers is not detected, they can be discharged before reaching the second container transport device, in particular from the transfer star-wheel or infeed star-wheel.

The second container transport device can comprise an actuating and/or stepping motor and/or servomotor, wherein the second transport element can be aligned by the actuating and/or stepping motor and/or servomotor.

Orientation of the second transport element is made possible by means of the actuating and/or stepping motor and/or servomotor in a simple, precise and targeted manner.

The second container transport device can comprise a plurality of actuating and/or stepping motor and/or servo-motors, in particular in each case one actuating and/or stepping motor and/or servomotor per second transport element.

The container transport system can be part of a block. Alternatively or additionally, the second container transport device can be a carousel. Alternatively or additionally, the first container transport device can be a transfer star-wheel or an infeed star-wheel.

This allows a flexible design of the container transport system.

In a block, all carousels can be connected to one another by linear conveyors and/or rotary units, in particular all the carousels can be connected to one another exclusively by linear conveyors and/or rotary units in a block.

The container transport system can comprise an application device, wherein the application device can be configured to apply labels to the containers of the second container transport device and/or to print onto the containers of the second container transport device.

By applying labels to the containers of the second container transport device and/or printing the containers, a multi-functionality of the second container transport device is achieved by holding, transporting and simultaneously treating the containers.

The application device can be a labeling assembly.

The second container transport device can be designed to orient the second transport element in a predefined orientation, in particular in the transport direction, after the container has been received.

The orientation of the second transport element allows the handling and further processing of containers of any shape.

The orientation can be an adjustment and/or rotation and/or positioning.

The orientation of the second transport element can be based on the detected (and optionally stored) orientation of the container held by the first transport element, i.e., in particular not based on a further detection step.

The second transport element can be oriented by the actuating and/or stepping motor and/or servomotor.

The orientation can in particular be an orientation for applying a label. The orientation can be an orientation for applying a label and/or an orientation when applying a label and/or an orientation before applying a label.

The second container transport device can directly follow the first container transport device along the transport path, or a further container transport device can be arranged therebetween.

Due to the possibility of providing or not providing a further container transport device, the container transport system can be flexibly adapted to external conditions.

If the further container transport device is arranged between the first container transport device and the second container transport device, the containers can be transferred from the first container transport device to the further container transport device and from the further container transport device to the second container transport device. The transfer from the first container transport device to the second container transport device is indirect in this case.

The first container transport device can be a transfer star-wheel, which transfers to an infeed star-wheel as the further container transport device, which in turn transfers to a carousel as the second container transport device.

The container transport system can comprise any combination and/or series of container transport devices. One or more further container transport devices can be arranged between the first and the second container transport device.

The disclosure further provides a method for transporting a plurality of containers in a container transport system in an analogous manner as described above, comprising obtaining, by the detection device, an orientation of a container held by a first transport element; determining, from the set of second transport elements, the second transport element corresponding to the container during transfer; calculating a target orientation of the second transport element based on the orientation; actuating and orienting the second transport element according to the target orientation; and transferring the container from the first transport element to the second transport element.

Such a method makes it possible to ensure interruption-free transport in a container transport system.

BRIEF DESCRIPTION OF THE FIGURES

The present disclosure will be explained in greater detail with reference to the following exemplary embodiments with reference to the figures, without limiting the disclosure to the specific embodiments shown. In the figures.

DETAILED DESCRIPTION

Figure 1:
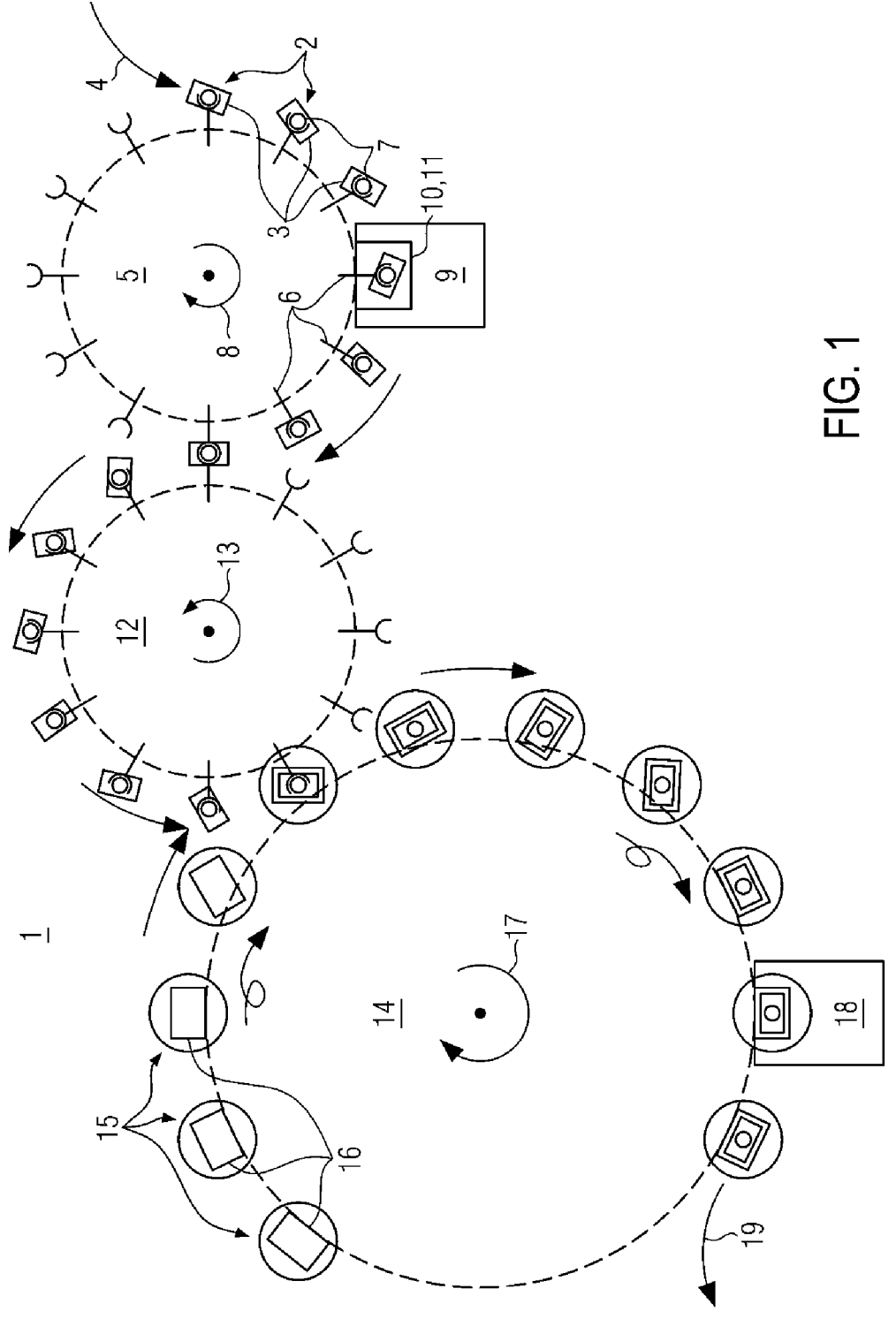
FIG. 1 schematically shows a container transport system.

FIG. 1 illustrates the schematic structure of an embodiment of a container transport system 1. In the container transport system 1 shown, containers in the form of plastic bottles 2 having a rectangular base area 3 are transported.

Such a container transport system 1 is, for example, arranged downstream of a blow molding machine in a blocked system of the food and/or consumer goods industry in the direction of the transfer of the bottles 2. The container transport system 1 shown is typically followed by a filling machine in which the bottles are filled with a beverage, for example. A blocking of the system can be designed as described in EP 2 292 550 A1. The individual machines of a system blocked in this way are connected to one another only by interposed transfer star-wheels.

FIG. 1 shows a direction 4 from which the bottles 2 are transferred from the blow molding machine to the transfer star-wheel 5 as the first container transport device without being oriented. The transfer star-wheel 5 holds and transports the bottles by means of first transport elements in the form of grippers 6. The grippers 6 are arranged at a distance along the circumference of the circular transfer star-wheel 5 and open radially outwards. The grippers 6 grip the bottles on the neck 7 during what is referred to as neck handling. The transfer star-wheel 5 rotates at a speed adapted to the speed of the rotary unit from which it takes the bottles in clockwise direction 8 and transports the bottles 2 on a circular path of the transport path.

A camera 9 as a detection device detects the transport path and the grippers 6 of the transfer star-wheel. The camera 9 is arranged above the bottles 2 and the grippers 6. Its exposure field detects a bottle 2 that is being transported through the exposure field of the stationary camera 9. At the time when the bottle 2 is centered in the exposure field, the camera 9 records an image 10. The image 10 then shows a plan view 11 of the rectangular bottle 2 from above. Based on the plan view 11 of the bottle and the known orientation of the camera 9 with respect to the transfer star-wheel 5, an orientation of the bottle 2 with respect to the transport direction of the bottle 2 is determined.

From the transfer star-wheel 5, the bottles 2 are transferred to a further container transport device designed as an infeed star-wheel 12. The infeed star-wheel 12 also grips the bottles 2 during neck handling using grippers 6. During the transfer of the non-aligned bottles 2, the grippers 6 of the transfer star-wheel 5 and the grippers 6 of the infeed star-wheel 12 are arranged one above the other in the vertical direction so that both grippers 6 hold the bottle at the moment of transfer. The grippers 6 of the circular infeed star-wheel 12 are arranged at a distance along the circumference. The grippers 6 open radially outwards. The infeed star-wheel 12 rotates in the counter-clockwise direction 13 at a speed adapted to the speed of the transfer star-wheel 5 and transports the bottles 2 on a circular path of the transport path.

The bottles are transferred from the infeed star-wheel 12 to a second container transport device designed as a labeling carousel 14. In the labeling carousel 14, the bottles 2 are held and transported on plates 15 as second transport elements. The plates 15 receive the bottles 2 and have recessed receptacles 16 adapted to the rectangular base area 3 of the bottles 2 in order to keep the bottles 2 stable during transport and labeling. Each plate 15 has a rotation angle sensor 27 that detects the respective orientation of the plate 15 about a vertical axis of the plate with respect to the transport direction. The plates 15 are arranged at a distance along the circumference of the labeling carousel. The labeling carousel 14 rotates in the clockwise direction 17 at a speed adapted to the speed of the infeed star-wheel 12 and transports the bottles 2 on a circular path of the transport path.

For each gripper 6 detected by the camera 9 and holding a bottle 2, a corresponding plate 15 of the labeling carousel 14 is known to a control device 26. The plate 15 corresponds in each case to the plate 15 that receives a bottle from the respective gripper 6.

In the transfer star-wheel 5 and the infeed star-wheel 12, the bottles 2 are transported without being oriented, but the orientation of the bottles 2 does not change from the image recording to the transfer to the labeling carousel 14, or only changes in a reproducible and predictable manner.

Based on the orientation of a bottle 2 in the transfer star-wheel 5 and the orientation of the corresponding plate 15 detected by the rotation angle sensor 27, the control device 26 generates an orientation signal. The orientation signal is stored in a shift register and sent at the time of orientation to the labeling carousel 14, which aligns the plate 15. The rectangular bottle 2 is received in a precisely fitting manner in the rectangular receptacle 16 of the plate 15 during the transfer.

At this point in time, the control device 26 knows the orientation of the plate 15 and of the bottle 2 on the plate 15 based on the original orientation of the plate 15 and the orientation signal. For the subsequent label transfer in the labeling carousel 14, the plates 15 are aligned along the transport direction of the bottles 2, for example such that a long side of the rectangular bottles is oriented along the transport direction, the tangent to the transport path. Finally, the label transfer takes place by means of an application device designed as a labeling assembly 18 on the longitudinal side of the rectangular bottles.

The labels can be pre-cut or detached labels. Self-adhesive labels or tubular labels are also conceivable. It is also possible to print the bottles and/or the labels.

Subsequently, the labeled bottles 2 leave the labeling carousel 14 in the direction 19 of an outlet wheel. The outlet wheel is comparable to the infeed star-wheel 12 and has grippers 6 that grip the bottles 2 at the neck 7.

Figure 2:
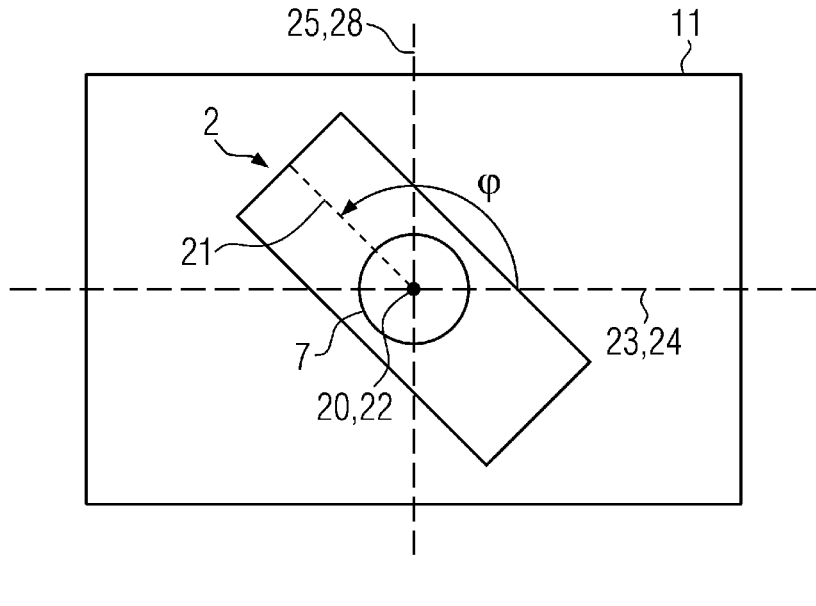
FIG. 2 schematically shows the orientation of a container in the first container transport device.

FIG. 2 schematically shows a view of the orientation of a container in the form of a rectangular bottle 2 in the first container transport device designed as transfer star-wheel 5.

Such a view can be recorded, for example, by a camera 9 of the detection device arranged above the transport path and the bottle 2, as described in FIG. 1.

In plan view 11, the view shows a rectangular bottle 2 having a round bottle neck 7 centrally in the image center 20.

A major semi-axis 21 of the base area of the container 2 is rotated by an angle $\varphi$ about a central longitudinal axis 22 (into the image plane) of the container with respect to a plane 23 that is tangential to the transport direction and in which the axis 22 is located. Because the image center 20 is aligned with the central longitudinal axis 22 of the container, the horizontal axis 24 bisecting the image is located in the plane 23 and coincides with the transport direction.

The angle $\varphi$ is characteristic of the orientation of the bottle 2 with respect to the transport direction of the bottle 2.

The angle $\varphi$ indicates a rotational orientation of the bottle 2 about a central vertical axis 22 and/or a central longitudinal axis 22 of the container with respect to a plane 23 that is tangential to the transport direction and in which the axis 22 is located.

It is also conceivable to specify another angle characteristic for the orientation of the bottle 2, for example an angle with respect to a radial direction 25 of the transfer starwheel, which, in the example shown, coincides with the vertical image axis 28.

In any case, an angle serves as a characteristic variable for the orientation of the bottle 2 as an input variable for the control device 26, on the basis of which the control device 26 generates an orientation signal for the corresponding plate 15 as the second transport element.

Figure 3:
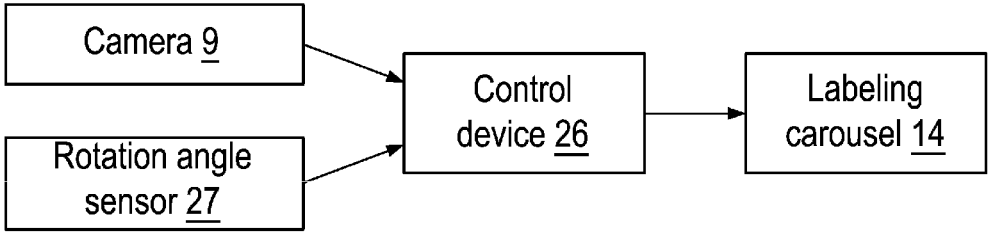
FIG. 3 shows a block diagram during operation of the container transport system.

FIG. 3 is a block diagram illustrating the relationships during operation of the container transport system 1.

A control device 26 comprising a processor and a storage device is provided for central control of operations in the container transport system 1. In this embodiment, the containers are rectangular bottles 2.

The control device 26 is connected to the camera 9, i.e., the detection device, via a data cable in order to obtain images 10.

The camera 9 is directed, from above a first transport element designed as a gripper 6, onto the gripper 6 and the bottle 2 held thereby. The camera 9 successively records images 10 of the bottles 2 that are transported in their respective grippers 6 through the exposure field of the camera 9. In this case, the camera 9 always records an image 10 when a bottle is centered in the exposure field of the camera 9 and sends the images 10 to the control device 26. The camera 9 then records an image 10, for example, when it is triggered by a light barrier or a contact on the gripper.

The control device 26 receives the images 10 and evaluates them. The control device 26 determines, for example, a variable characteristic of the orientation of the bottles 2, such as the angle φ shown in FIG. 2. At the same time, the control device 26 receives information from rotation angle sensors 27 which are attached to the second transport elements marked as plates 15 and measure the orientation of the plates 15 with respect to the transport direction.

As described In FIG. 1, the assignment of each gripper 6 to a plate 15 of the labeling carousel 14 as a second container transport device takes place in the control device 26. The assignment is made in such a way that the plate 15 corresponds in each case to the plate 15 that receives a bottle 2 from the respective gripper 6.

The control device 26 generates orientation signals for orienting the plates 15 which are temporarily stored in a shift register until they are transmitted at the orientation time to the labeling carousel 14 for orienting the plates 15. The orientation signals indicate, for example, the angle about which a specific plate 15 must be rotated in order to be oriented. The orientation signals can also comprise the fact that a specific plate 15 does not have to be rotated, for example because it has already been oriented.

The bottles 2 are transferred from the grippers 6 to the oriented plates 15. The oriented plates 15 receive the bottles 2. Consequently, problems during transfer are avoided.

After the transfer, the control device 26 stores the instantaneous orientation of the plates 15, which is obtained from the orientation signals and the original orientations of the plates 15. As described above, the original orientations of the plates 15 are known from the information of the rotation angle sensors 27.

The control device 26 transmits orientation signals to the labeling carousel 14, which aligns the bottles 2 with respect to the transport direction, for example in such a way that longitudinal sides of the bottles 2 lie in the transport direction.

This ensures that the labels are transferred in a precisely fitting manner to the longitudinal sides of the bottles 2.

The invention claimed is:

1. A container transport system for transporting a plurality of containers along a transport path comprising:
   a first container transport device comprising a plurality of first transport elements for holding and transporting the containers;
   a detection device;
   a second container transport device comprising a plurality of second transport elements for holding and transporting the containers, wherein the second container transport device is arranged along the transport path downstream of the first container transport device,
   wherein the detection device is configured to detect the orientation of a container held by a first transport element,
   wherein the second container transport device is configured to align a second transport element based on the orientation of the container held by the first transport element, which orientation is detected by the detection device, in order to receive the container, and
   wherein the second transport element is aligned based on the orientation of the container held by the first transport element before receiving the container.

2. The container transport system according to claim 1, comprising a control device,
   wherein the control device is designed to generate an orientation signal for orienting the second transport element based on the detected orientation.

3. The container transport system according to claim 1, wherein the detection device is connected to the second container transport device in a wireless and/or wired manner.

4. The container transport system according to claim 1, wherein the container transport system has a storage device for assigning the orientation signal to the second transport element.

5. The container transport system according to claim 1, wherein the second container transport device is configured to rotate the second transport element about a vertical axis for alignment.

6. The container transport system according to claim 1, wherein the first transport elements are designed for hanging or standing transport of the containers, and/or wherein the first transport elements comprise grippers in the case of the configuration for hanging transport, or plates comprising receptacles for the containers in the case of the configuration for standing transport, and/or wherein the second transport elements are designed for hanging or standing transport of the containers, and/or wherein the second transport elements comprise grippers in the case of the configuration for hanging transport, or plates comprising receptacles for the containers in the case of the configuration for standing transport, and/or wherein the containers are bottles.

7. The container transport system according to claim 6, wherein, in the case of the configuration for standing transport, the plates have a noncircular base area.

8. The container transport system according to claim 1, wherein the detection device comprises an image capturing device, and/or wherein the detection device has a rotation angle sensor, and/or wherein, in the case of the image capturing device, the detection device is designed to detect a first transport element from below and/or above and/or laterally, and/or wherein, in the case of the image capturing device, the detection device is designed to detect the orientation of the container held by the first transport element by recording an image.

9. The container transport system according to claim 1, wherein the container transport system is configured to detect the orientation without interrupting the transport of the container.

10. The container transport system according to claim 1, wherein the second container transport device comprises an actuating and/or stepping motor and/or servomotor, wherein the second transport element is aligned by the actuating and/or stepping motor and/or servomotor.

11. The container transport system according to claim 1, wherein the container transport system is part of a block, and/or wherein the second container transport device is a carousel, and/or wherein the first container transport device is a transfer star-wheel or an infeed star-wheel.

12. The container transport system according to claim 1, comprising an application device, wherein the application device is configured to apply labels to the containers of the second container transport device and/or to print onto the containers of the second container transport device.

13. The container transport system according to claim 12, wherein the second container transport device is designed to orient the transport element in a predefined orientation after receiving the container.

14. The container transport system according to claim 1, wherein the second container transport device directly follows the first container transport device along the transport path, or a further container transport device is arranged therebetween.

15. A method for transporting a plurality of containers in a container transport system according to claim 1, comprising:

obtaining, by the detection device, an orientation of a container held by a first transport element, determining, from the set of second transport elements, the second transport element corresponding to the container during transfer, calculating a target orientation of the second transport element based on the orientation, actuating and orienting the second transport element according to the target orientation, transferring the container from the first transport element to the second transport element, wherein the second transport element is aligned based on the orientation of the container held by the first transport element before receiving the container.

* * * * *